US009098349B2

(12) United States Patent
Gerovac et al.

(10) Patent No.: US 9,098,349 B2
(45) Date of Patent: Aug. 4, 2015

(54) DYNAMIC RESOURCE ALLOCATION

(75) Inventors: Branko J. Gerovac, Lexington, MA (US); David C. Carver, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 636 days.

(21) Appl. No.: 13/451,986

(22) Filed: Apr. 20, 2012

(65) Prior Publication Data

US 2012/0259977 A1    Oct. 11, 2012

Related U.S. Application Data

(63) Continuation of application No. 12/170,749, filed on Jul. 10, 2008, now Pat. No. 8,191,070.

(51) Int. Cl.
*G06F 17/30* (2006.01)
*G06F 9/50* (2006.01)
*H04L 29/08* (2006.01)

(52) U.S. Cl.
CPC ........ *G06F 9/5083* (2013.01); *G06F 17/30595* (2013.01); *H04L 67/32* (2013.01); *G06F 2209/5022* (2013.01)

(58) Field of Classification Search
None
See application file for complete search history.

(56) References Cited

U.S. PATENT DOCUMENTS

| | | |
|---|---|---|
| 3,746,780 A | 7/1973 | Stetten et al. |
| 3,851,104 A | 11/1974 | Willard et al. |
| 4,845,658 A | 7/1989 | Gifford |
| 5,132,992 A | 7/1992 | Yurt et al. |
| 5,581,552 A | 12/1996 | Civanlar et al. |
| 5,581,784 A | 12/1996 | Tobagi et al. |
| 5,583,995 A | 12/1996 | Gardner et al. |
| 5,608,448 A | 3/1997 | Smoral et al. |
| 5,640,563 A | 6/1997 | Carmon |
| 5,787,482 A | 7/1998 | Chen et al. |
| 5,805,804 A | 9/1998 | Laursen et al. |
| 5,862,312 A | 1/1999 | Mann et al. |
| 5,926,649 A | 7/1999 | Ma et al. |
| 6,067,412 A | 5/2000 | Blake et al. |

(Continued)

FOREIGN PATENT DOCUMENTS

| | | |
|---|---|---|
| WO | WO 2008/137334 | 11/2008 |
| WO | WO 2010/006127 | 1/2010 |

(Continued)

OTHER PUBLICATIONS

Downloaded Jun. 30, 2010 for U.S. Appl. No. 11/744,394.

(Continued)

*Primary Examiner* — Bai D. Vu
(74) *Attorney, Agent, or Firm* — Harrity & Harrity, LLP

(57) ABSTRACT

A computer-implemented method includes detecting an actual workload representative of a pattern of access of a plurality of items of content; comparing the actual workload against a prescriptive workload to determine an occurrence of a substantial deviation from the prescriptive workload; and upon determining the occurrence of the substantial deviation, revising the prescriptive workload based at least in part on the actual workload. The plurality of items is stored on resources of a storage environment according to one of a plurality of resource allocation arrangements. The prescriptive workload including a plurality of categories, each category being associated with a respective one of the plurality of resource allocation arrangements.

20 Claims, 9 Drawing Sheets

(56) References Cited

U.S. PATENT DOCUMENTS

| | | | |
|---|---|---|---|
| 6,230,200 | B1 | 5/2001 | Forecast et al. |
| 6,374,336 | B1 | 4/2002 | Peters et al. |
| 6,401,126 | B1 | 6/2002 | Douceur et al. |
| 6,609,149 | B1 | 8/2003 | Bandera et al. |
| 7,058,947 | B1 | 6/2006 | Raja et al. |
| 7,277,978 | B2 | 10/2007 | Khatami et al. |
| 7,503,047 | B1 | 3/2009 | Richter |
| 2002/0129123 | A1* | 9/2002 | Johnson et al. ............ 709/219 |
| 2002/0152305 | A1* | 10/2002 | Jackson et al. ............ 709/224 |
| 2003/0005457 | A1 | 1/2003 | Faibish et al. |
| 2003/0046396 | A1* | 3/2003 | Richter et al. ............ 709/226 |
| 2003/0140051 | A1 | 7/2003 | Fujiwara et al. |
| 2003/0195948 | A1 | 10/2003 | Takao et al. |
| 2004/0103437 | A1 | 5/2004 | Allegrezza et al. |
| 2004/0153171 | A1* | 8/2004 | Brandt et al. ............ 700/9 |
| 2004/0198386 | A1 | 10/2004 | Dupray |
| 2005/0181803 | A1 | 8/2005 | Weaver et al. |
| 2005/0262246 | A1 | 11/2005 | Menon et al. |
| 2006/0062555 | A1 | 3/2006 | Zimmermann et al. |
| 2006/0087990 | A1 | 4/2006 | Kakivaya et al. |
| 2006/0129691 | A1* | 6/2006 | Coffee et al. ............ 709/230 |
| 2006/0190552 | A1 | 8/2006 | Henze et al. |
| 2006/0190944 | A1 | 8/2006 | Moon et al. |
| 2006/0259662 | A1 | 11/2006 | Furukawa et al. |
| 2006/0272015 | A1 | 11/2006 | Frank et al. |
| 2008/0109580 | A1 | 5/2008 | Carlson et al. |
| 2008/0168223 | A1* | 7/2008 | Reeves et al. ............ 711/114 |
| 2008/0244033 | A1 | 10/2008 | Hook et al. |
| 2008/0273540 | A1 | 11/2008 | Gerovac et al. |
| 2010/0010999 | A1 | 1/2010 | Gerovac et al. |
| 2010/0011002 | A1 | 1/2010 | Gerovac et al. |
| 2010/0011003 | A1 | 1/2010 | Carver et al. |
| 2010/0011091 | A1 | 1/2010 | Carver et al. |
| 2010/0011096 | A1 | 1/2010 | Gerovac et al. |
| 2010/0011145 | A1 | 1/2010 | Carver et al. |
| 2010/0011364 | A1 | 1/2010 | Gerovac et al. |
| 2010/0011365 | A1 | 1/2010 | Gerovac et al. |
| 2010/0011366 | A1 | 1/2010 | Gerovac et al. |

FOREIGN PATENT DOCUMENTS

| | | |
|---|---|---|
| WO | WO 2010/006132 | 1/2010 |
| WO | WO 2010/006134 | 1/2010 |

OTHER PUBLICATIONS

Office Action dated May 7, 2010 for U.S. Appl. No. 12/170,769.
Restriction Requirement dated Jul. 9, 2010 from U.S. Appl. No. 12/170,787.
Restriction Requirement dated Jun. 10, 2010 from U.S. Appl. No. 12/170,624.
PCT Search Report of the ISA for PCT/US2009/050057 dated Jan. 14, 2010.
Written Opinion of the ISA for PCT/US2009/050057 dated Jan. 14, 2010.
PCT International Preliminary Report of Patentability, date mailed Nov. 19, 2009, for PCT/US2008/061401.
PCT Invitation to Pay Additional Fees dated Oct. 26, 2009 for PCT Pat. No. PCT/US2009/050057 filed on Jul. 9, 2009.
Androutsellis-Theotokis et al., "A Survey of Peer-to-Peer Content Distribution Technologies", ACM Computing Surveys, vol. 36, No. 4, pp. 335-371, Dec. 2004.
Gal: "Algorithms and Data Structures for Flash Memories;" ACM Computing Surveys, vol. 37, No. 2; DOI=http://doi.acm.org/10.1145/1089733.1089735; Jun. 2005; pp. 138-163.
"NAND Flash Memories and Programming NAND Flash Memories Using ELNEC Device Programmers Application Note Version 2.01;" Sep. 2006, pp. 1-31.
Mourad; "Issues in the design of a storage server for video-on-demand;" Multimedia Systems; vol. 4, No. 2; Apr. 1, 1996; XP008040912; pp. 70-86.
Samsung Memory Division; NAND Flash ECC Algorithm 256B; Jun. 24, 2004; 8 sheets.
Samsung Memory Division; ECC Algorithm; 512B; Apr. 28, 2005; 8 sheets.
Samsung Memory Division; NAND Flash Spare Area Assignment Standard; Apr. 27, 2005; 5 sheets.
Venugopal et al.; "A Taxonomy of Data Grids for Distributed Data Sharing, Management, and Processing;" AMC Computing Surveys, vol. 38, Mar. 2006; Article 3, pp. 1-53.
PCT Search Report of the ISA for PCT/US2008/061401 dated Jul. 1, 2008.
PCT Search Report and Written Opinion of the ISA for PCT/US2009/050051 dated Sep. 7, 2009.
Ruemmler et al., "An introduction to disk drive modeling." IEEE Computer Magazine, 27(3), pp. 17-29, Mar. 1994.
Talagal et al., "Microbenchmark-based extraction of local and global disk characteristics", Technical Report. Department of Computer Science, University of California at Berkeley, CSD-99/1063, 1999.
Schindler et al., "Automated disk drive characterization", Technical Report CMU-CS-99-176, Carnegie Mellon University, Nov. 1999.
Worthington et al., "On-Line Extraction of SCSI Disk Drive Parameters" SIGMETRICS 95, pp. 146-156.1995.
Teorey et al., "A Comparative Analysis of Disk Scheduling Policies", Communications of the ACM, vol. 15 No. 3, pp. 177-184, Mar. 1972.
Oney, "Queueing Analysis of the Scan Policy for Moving-Head Disks", Journal of the Association for Computing Machinery, vol. 22, No. 3, Jul. 1975, pp. 397-412.
Worthington et al., "Scheduling for Modern Disk Drives and Non-Random Workloads", University of Michigan, Technical Report CSE-TR-194-94, Mar. 1, 1994.
Reddy et al., Issues in a multimedia system, IEEE Computer Magazine 27, 3, pp. 69-74, Mar. 1994.
Zimmermann, "Continuous Media Placement and Scheduling in Heterogeneous Disk Storage Systems", Technical Report USC-99-699, 1999.
Shenoy et al., "Cello: A Disk Scheduling Framework for Next Generation Operating Systems", Real-Time Syst. 22, 1-2, 9-48, Jan. 2002.
Goel et al., "SCADDAR: An Efficient Randomized Technique to Reorganize Continuous Media Blocks", 18th International Conference on Data Engineering (ICDE 2002), San Jose, California, Feb. 26-Mar. 1, 2002.
Shahabi et al., "Yima: A Second-Generation Continuous Media Server", IEEE Computer Magazine, pp. 56-64, Jun. 2002.
Schroeder et al., "Disk failures in the real world: What does an MTTF of 1,000,000 hours mean to you?", Proceedings of the 5th USENIX Conference on File and Storage Technologies (FAST '07), pp. 1-16, 2007.
Pinheiro et al., "Failure Trends in a Large Disk Drive Population", Proceedings of the 5th USENIX Conference on File and Storage Technologies (FAST '07), pp. 17-28, 2007.
Amazon, "Amazon S3 Developer Guide (API Version Mar. 1, 2006)", Internet, 2007.
Liskov et al., "Providing Persistent Objects in Distributed Systems", Proceedings of the 13th European Conference on Object-Oriented Programming, Jun. 14-18, 1999.
Liskov et al., "Transactional File Systems Can Be Fast", Proceedings of the 11th Workshop on ACM SIGOPS European Workshop: Beyond the PC, Sep. 19-22, 2004.
Braam, "File Systems for Clusters from a Protocol Perspective", Second Extreme Linux Topics Workshop, Monterey, Jun. 1999.
Hartman et al., "The Zebra Striped Network File System", ACM Transactions on Computer Systems, vol. 13, No. 3, pp. 274-310, Aug. 1995.
Long et al., "Swift/RAID: A Distributed RAID System", Computer Systems, vol. 7, No. 3, pp. 333-359, Jun. 1994.
Patterson et al., "A Case for Redundant Arrays of Inexpensive Disks (RAID)" Proceedings of the 1988 ACM SIGMOD International Conference on Management of Data, ACM Press, Jun. 1988.
Chen et al., RAID; High-Performance, Reliable Secondary Storage, ACM Computer Survey vol. 26, No. 2, pp. 145-185, Jun. 1994.
Stonebraker et al., "Distributed RAID—A New Multiple Copy Algorithm", Proceedings of the Sixth International Conference on Data Engineering, IEEE Computer Society, pp. 430-437, Feb. 1990.

(56) References Cited

OTHER PUBLICATIONS

Liu et al.; "Scheduling Algorithms for Multiprogramming in a Hard-Read-Time Environment" Journal of the Association for Computing Machinery, vol. 20, No. 1; DOI=http://doi.acm.org/10.1145/321738.321743; Jan. 1973; pp. 46-61.

Sha et al.; "A Systematic Approach to Designing Distributed Real-Time Systems;" Computer vol. 26, No. 9; DOI=http://dx.doi.org//10.1109/2.231276; Sep. 1993; pp. 67-78.

Thouin et al., "Video-on-Demand Networks: Design Approaches and Future Challenges", IEEE Network, Special Issue, vol. 21, No. 2, pp. 42-48, Mar. 2007.

Stoller et al., "Storage Replication and Layout in Video-on-Demand Servers", Proceedings of the 5th International Workshop on Network and Operating System Support for Digital Audio and Video, Apr. 19-21, 1995.

Tetzlaff et al., "Elements of scalable video servers", Proceedings of the 40th IEEE Computer Society International Conference, pp. 239-248, Mar. 1995.

Wong et al., "Strategic Selection and Replication of Movies by Trend-Calibrated Movie-Demand Model", Proceedings of the 2000 international Conference on Microelectronic Systems Education, IEEE Computer Society, pp. 97-100, Nov. 2000.

Little et al., "Popularity-Based Assignment of Movies to Storage Devices in a Video-on-Demand System", Multimedia Systems, vol. 2, No. 6, pp. 280-287, Jan. 1995.

Griwodz et al., "Long-term Movie Popularity Models in Video-on-Demand Systems", Proceedings of the 5th ACM International Conference on Multimedia, pp. 349-357, Nov. 1997.

Ghandeharizadeh et al., "Continuous Display of Video Objects Using Multi-Zone Disks", Univ. of Southern California, USC-CSE-94-592, Apr. 12, 1995.

Sinah et al., "Intelligent Architectures for Managing Content", Communications Technology Magazine, May 1, 2003.

* cited by examiner

*Re-modeling*

# DYNAMIC RESOURCE ALLOCATION

CROSS-REFERENCE TO RELATED APPLICATIONS

This application is a continuation of U.S. application Ser. No. 12/170,749, filed Jul. 10, 2008, now U.S. Pat. No. 8,191,070 which is related to U.S. application Ser. No. 12/170,646, filed Jul. 10, 2008, and U.S. application Ser. No. 12/170,732 filed Jul. 10, 2008. The contents of the above applications are incorporated herein by reference.

BACKGROUND

This specification relates to resource allocation in a distributed system for data storage and access.

Distributed network-based data storage, for example accessible over the Internet, has various applications. One application is video storage and access.

During the past decade, online video streaming has gained increasing popularity among Internet users as high speed Internet service is now readily available for households. For example, while traditional video delivery systems (e.g., cable television systems) may no longer satisfy customers' growing demand for convenient access and instant delivery, movie consumers may soon turn to online video stores that can provide such service.

However, providing reliable download services to consumers on a large scale at an affordable cost presents many challenges. For example, configuring a network-based video storage and delivery system may encounter dynamic distributed real-time resource allocation issues that can be characterized as an NP complete problem. Conventional approaches for solving NP complete problems attempt to restrict the problem in some manners to conduct an exhaustive search for a deterministic solution. These procedures are often computationally expensive, yet may still produce undesirable results.

SUMMARY

In one aspect, in general, the invention features a computer-implemented method that includes detecting an actual workload representative of a pattern of access of a plurality of items of content; comparing the actual workload against a prescriptive workload to determine an occurrence of a substantial deviation from the prescriptive workload; and upon determining the occurrence of the substantial deviation, revising the prescriptive workload based at least in part on the actual workload. The plurality of items is stored on resources of a storage environment according to one of a plurality of resource allocation arrangements. The prescriptive workload including a plurality of categories, each category being associated with a respective one of the plurality of resource allocation arrangements.

Aspect of the invention may include one or more of the following features.

Each one of the plurality of categories may be defined in relation to a respective range of values of a first attribute. The first attribute characterizes one or more operational objectives of the plurality of items of content. The method of revising the prescriptive workload includes modifying at least a first category by changing the definition of the first category to a new range of values of the first attribute. The method of revising the prescriptive workload may further include associating the modified first category with a proper one of the plurality of resource allocation arrangements, such that a result of the association is compatible with an availability of the resources in the storage environment. The resources in the storage environment include storage resources and access resources.

For each one of the plurality of categories, the associated respective resource allocation arrangement may include a first specification of the number of instances of an item associated with the category is stored in the storage system, and a second specification of a partially defined destination for elements of the item. The resources of the storage environment may include at least a first storage component having a plurality of distinct regions, and the second specification of the partially defined destination for elements of the item associates elements of the item with one of the plurality of distinct regions. For each one of the plurality of categories, a respective level of resource capacity is allocated to the item in the category by applying the respective one of the resource allocation arrangements. The respective level of resource capacity includes at least a storage capacity that relates to the number of instances of the item in the category stored on resources of the storage environment; and an access capacity that relates to an allowable access bandwidth provided to the item in the category.

The method of revising the prescriptive workload may include, for at least some of the plurality of categories, changing the respective level of resource capacity by changing the respective one of the resource allocation arrangements associated with the category. The method of changing the respective one of resource allocation arrangements may include changing the first specification of the number of instances of the item associated with the category is stored in the storage system, or alternatively, include changing the second specification of the partially defined destination for elements of the item.

The prescriptive workload may be maintained in a first database. The computer implemented method may further include generating a new prescriptive workload based on a result of revising the prescriptive workload. The new prescriptive workload enables re-allocation of resources of the storage environment to the plurality of items, the reallocation being reflective of the actual workload. The substantial deviation occurs when a deviation of the actual workload from the prescriptive workload exceeds a deviation threshold.

The method of detecting the actual workload may include obtaining information on one or more of the following: a number of concurrent access requests to each one of the plurality of items at a given time, an aggregate of access requests to each one of plurality of items during a detection period, and a number and frequency of access requests being denied with respective to each one of plurality of items due to resource unavailability.

In another aspect, in general, the invention features a computer-implemented method that includes detecting an actual workload representative of a pattern of access of a plurality of items of content, the plurality of items being stored on resources of an storage environment according to one of a plurality of resource allocation arrangements; comparing the actual workload against a first workload model to determine an occurrence of a substantial deviation from the first workload model, and upon determining the occurrence of the substantial deviation, determining a second workload model based at least in part on the actual workload. The first workload model includes a first set of schemas, each schema being associated with a respective one of a first set of resource allocation arrangements. The second workload model includes a second set of schemas, each schema being associated with a respective one of a second set of resource allocation arrangements.

Other general aspects include other combinations of the aspects and features described above and other aspects and features expressed as methods, apparatus, systems, computer program products, and in other ways.

Other features and advantages of the invention are apparent from the following description, and from the claims.

DETAILED DESCRIPTION

1 System Overview

In a distributed system, there can be a library of content characterized by a broad range of attributes (e.g., data type, length, popularity and access patterns) and operational objectives (e.g., performance, integrity, and resilience), such that each piece of content may involve the use of system resources on different levels. For example, content of higher popularity may generally need more access resources (e.g., readout bandwidth) in to enhance their streaming performance; while content of greater importance, on the other hand, may need more storage space (e.g., to store redundancy data) to ensure data integrity.

Managing a finite amount of system resources in a way that can well serve the operational objectives of content usage can be a complex problem. Moreover, the level of difficulty can grow progressively as the system increases in size. In some systems, it is advantageous to apply domain-specific knowledge in managing system resources across multiple dimensions (such as storage and access resources). This approach will be illustrated in the context of a distributed system for data storage and access, which is described in U.S. application Ser. No. 12/170,657, filed Jul. 10, 2008 (now U.S. Pat. No. 8,099,402), the disclosure of which is incorporated herein by reference.

Figure 1:
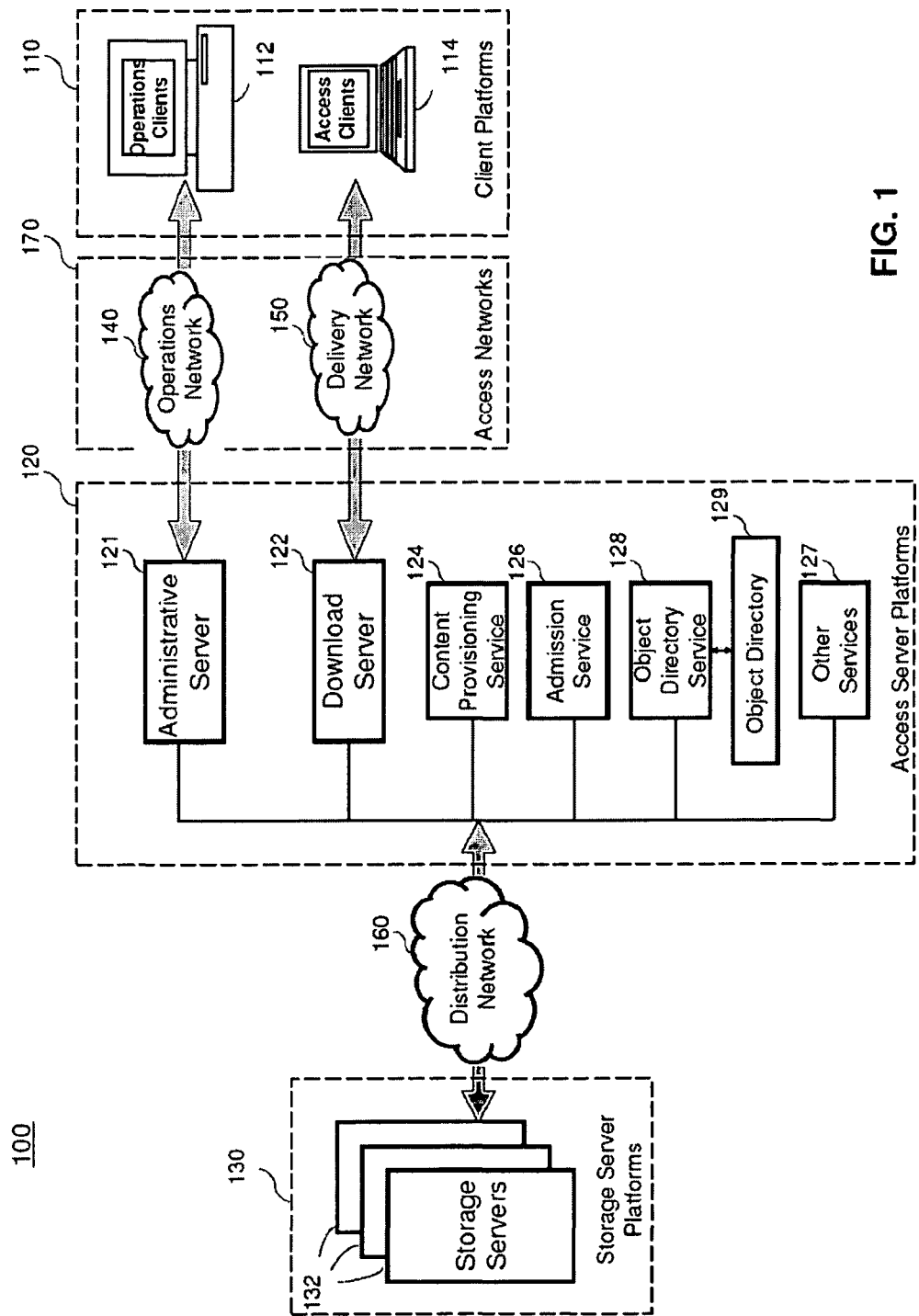
FIG. 1 is a block diagram of an exemplary distributed system for data storage and access.

Referring to FIG. 1, briefly, a distributed system 100 consists of three basic types of computing platforms for content storage and delivery: storage server platforms 130, access server platforms 120, and client platforms 110. The term "platform" is used to refer to a collection of components, which may, for example, be hosted on a single computer, or distributed over multiple computers.

The storage server platforms 130 may host multiple storage servers 132, which contain storage and provide the capability to read and write data. For example, each server may be hosted on one computer, or its function may itself be distributed on multiple hardware elements.

The access server platforms 120 provide access services that collectively provide applications with one or more methods of accessing data/content with respect to storage servers of the system. Some access services handle the data according to a prescribed access protocol/regime/interface (e.g., HTTP, RTSP, NFS, etc). Other access services manage the resources of the system and regulate access to content accordingly. Services that manage resources of the system include for example, a content provisioning service 124, which allocates resources of the system to store and deliver content, and an admission service 126, which admits sessions when called upon by various session requests in the system.

In general, the access server platforms 120 are interconnected on one side with the storage server platforms 130 by a distribution network 160, and on the other side with the client platforms 110 by an access network 170. The access network 170 allows various types of clients to communicate with the access server platforms 120 via one or multiple channels. For example, operations client 112 (e.g., administrators of online video stores) may communicate with an administrative server 121 via an operations network 140, while access clients 114 (e.g., customers of online video stores) may communicate with a download server 122 via a delivery network 150. Both administrative and download servers 121 and 122 may interact with the rest of the system to handle various client requests such as uploading and downloading content.

In uploading content to the storage, the content provisioning service 124 determines a good way of arranging data across available storage resources that can satisfy operational objectives of the content. Examples of operational objectives include performance objectives (such as accessibility), integrity, resilience, and power consumption, each of which can be characterized by one or multiple attributes. For instance, a popularity attribute associated with a viewing frequency of a particular title can represent a desired level of content accessibility—one type of operational objective that the system may intend to serve.

The process of making good provisioning decisions that take into account the objectives of each individual in the system can represent an NP Complete problem, which is particularly complex for large systems. One approach to solving this problem involves applying domain knowledge to organize the problem space and to form partial solutions (e.g., models) that can guide the search for optimal solutions in a more efficient manner. For example, a pattern of access to titles of a library can be used to establish a model workload that contains a finite set of categories that are each mapped to a partially determined allocation scheme that represents a way of resource arrangement. Using the model, content provisioning can be then approached as a two-step process—firstly, attribution of each piece of content to a proper category, and secondly, resource allocation within the local scheme of that category. Model-based content provisioning will be described in greater detail in the following sections.

2 Model-Based Content Provisioning

Figure 2:
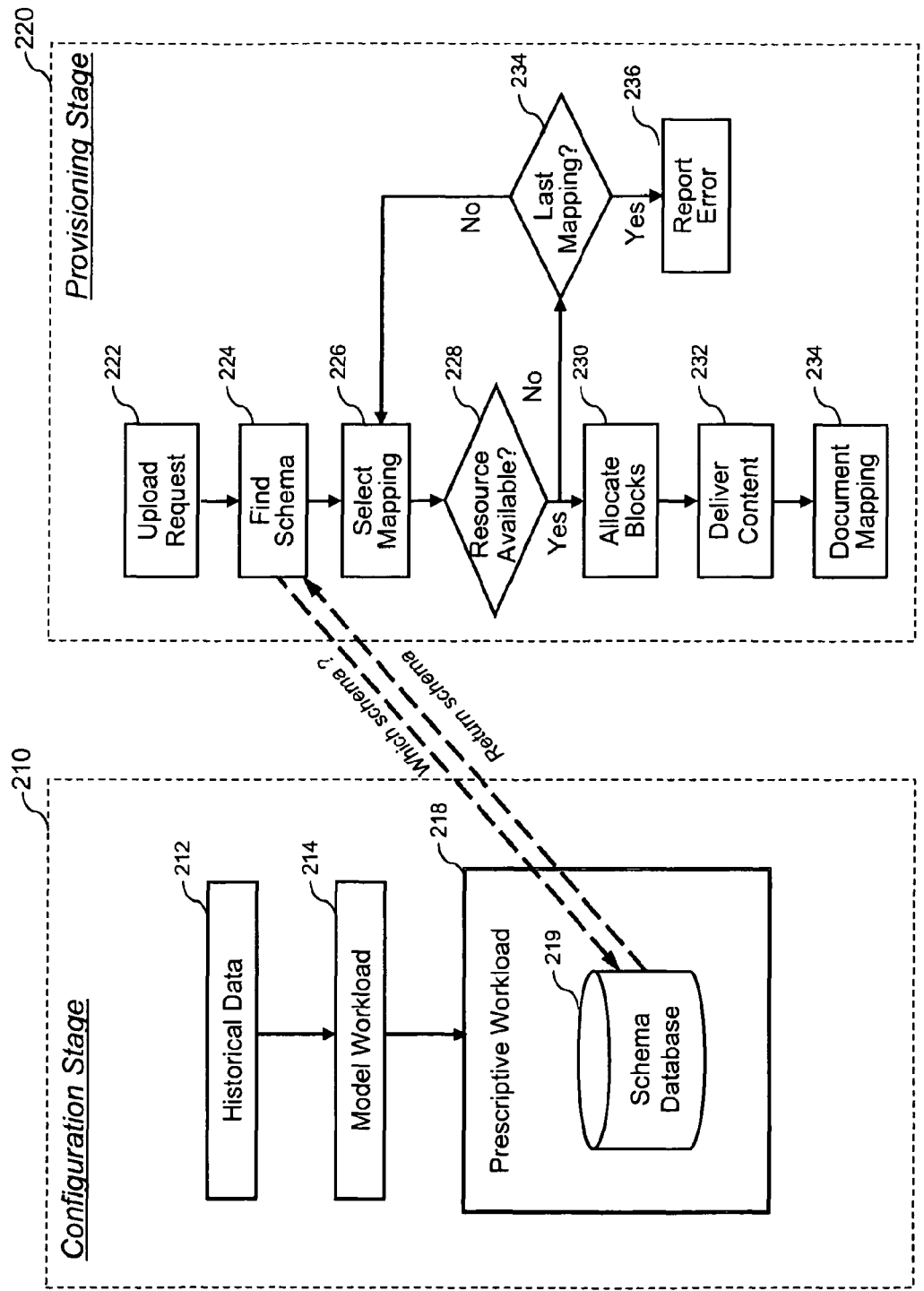
FIG. 2 is a flow chart illustrating the operation of model-based content provisioning.

Referring to FIG. 2, in one implementation of a model-based approach for content provisioning, the content provisioning service makes use of model-based partial solutions, which are obtained during a configuration stage 210, to pre-compute information that is later used during a provisioning stage 220 for determining a good arrangement of content on the storage resources of the system.

At the configuration stage 210, for example, empirical data 212 are used to generate a model workload 214 that represents a type of workload the system aims to support. Empirical data can range from a verbal description of the overall usage of video, through a detailed weblog of all events from a running system including video viewing events. One example of empirical data 212 is a statistical usage distribution provided by video store operators, characterizing the number of views per each title of a library over a 24-hour service window. Another example is a geographic profile of viewing habits among consumers across a wide range of areas. In situations where empirical data is unavailable or insufficient, other information such as customer projections of content usage and service objectives can also be used for creating the model workload 214.

The model workload 214 can be manually generated prior to being introduced to the system, or automated (e.g., in a heuristic way) by the system itself. Based on the model workload 214, a prescriptive workload 218 is created. Very generally, the prescriptive workload 218 offers partial solutions to the problem of resource allocation by partitioning the problem space in a discrete way. A prescriptive workload 218 can be generated for example, by mapping the model workload 214 onto a particular system configuration—either 1) the system size is fixed and the workload is scaled to fit the system; 2) the workload is fixed and the system size is scaled to match the workload; or 3) a combination or both. In some applications where content attributes are provided as a characterization of operational objectives, the prescriptive workload 218 can be viewed as a partitioning of attribute space, defining a set of attribute-based categories (referred to herein as schemas) in which each individual can be mapped to a type of resource arrangement associated with that category. Several approaches to creating the prescriptive workload 218 will be described in greater detail later.

The prescriptive workload 218 can be represented in the system as a collection of configuration data (i.e., schema database 219) that describe how to provision and access objects in the system. The schema database 219 includes schemas and provision tables, which together provide a description of a definition of each schema and the resource arrangement associated with that schema. Take popularity-based content provisioning for example. One schema can be defined to include titles in the top 5% of the most frequently viewed in the library. For a system that aims to provide a maximum of Mbps bandwidth for each title in this category with an aggregate limit of 800 Mbps or more for all titles in the category, the schema database 219 describes the set of arrangement combinations that can support such a bandwidth goal, including for example, distributing content data across a span of eight disks. These types of information are later used during content provisioning to help the content provisioning service 124 to determine a good way of allocating resources that addresses the operational objective(s) (here, accessibility) of the content.

In addition to providing the desired accessibility of the content, the prescriptive workload 218 and associated schemas are also designed to reduce a degree of inter-title contention in the system. Examples of a prescriptive workload that creates a high level of inter-title contention include storing four copies each of "Shrek I" and "Shrek II" on one single server that has a maximum readout rate of 100 Mbps. When "Shrek I" is at peak usage (e.g., streamed at 90 Mbps) that occupies most or all of the server's access capacity, the remaining data on this server (including "Shrek II") are rendered inaccessible, while resources of other servers in the system may be left idle. In comparison, a less contentious prescriptive workload, for example, stores one copy of "Shrek I" and "Shrek II" per server across four different servers, so that the peak usage of one object does not exceed 25% of a server's output capacity, without blocking access to other data on these servers.

During the provisioning stage 220, content provisioning service 124 makes use of information in the schema database 219 to provision content in the following way. Upon receiving a request 222 for uploading a piece of content, the content provisioning service first determines a proper schema for this content, by matching content attribute(s) against the partitioning results in the schema database (step 224). If, for example, this content ranks among the top 5% popular titles, the exemplary schema described above is selected. Accordingly, content data will be stripped across eight disks. Given this eight disk requirement, there still exists multiple ways of mapping content to the storage. For a system consisting of 16 disks of storage, one option is to map content to disks number 1 through number 8, and a second option is to use disk number 9 through number 16 (and possibly other eight-disk combinations).

Among various mappings, content provisioning service 124 selects a best mapping, for example, the one with the lowest server occupancy (step 226). If there are sufficient resources available in this best mapping (step 228), content provisioning service 124 proceeds to allocate a set of physical blocks on each of the eight disk drives according to the best mapping (step 230) and subsequently, the administrative server 121 delivers the content data to these locations (step 232). If content provisioning service 124 fails to locate sufficient resources in the best mapping, it selects the next mapping to repeat the evaluation process 228 until an available mapping has been found and committed. In some situations when multiple copies of a piece of content are desired on the system, the content provisioning service may determine for each individual copy a best available mapping and store data accordingly. After data delivery completes, results of the mapping (including the disk locations of the data) are documented in the object directory 129, so that content can be conveniently accessed in the future by other services (e.g., admission service 126)

Usually, when the system is operating normally, there is space available for new content as long as the resources used by an aggregate of titles are within designed limits. In rare occasions, if none of the mappings are deemed available after an exhaustive search (e.g., due to system overbooking), an error 236 is reported. Errors can be handled by operator intervention, or alternatively by the system itself via other services (e.g., management service).

3 Creating Models

By partitioning the problem space and formulating partial solutions, model and prescriptive workloads can help content provisioning service 124 to manage resources across multiple dimensions in a more efficient manner. There are various approaches to creating good models. One approach, for example, is to perform k-ary subdivision in n-space, where k is a subdivision factor (e.g., k=2 is binary subdivision) and n is the number of independent attributes. Here, an attribute can be a characterization of one of operational objectives (such as popularity, resilience, and integrity), independent resource pools and their characteristics (such arrays of disks and the disks' model(s)), and/or other aspects in resource management.

Figure 3:
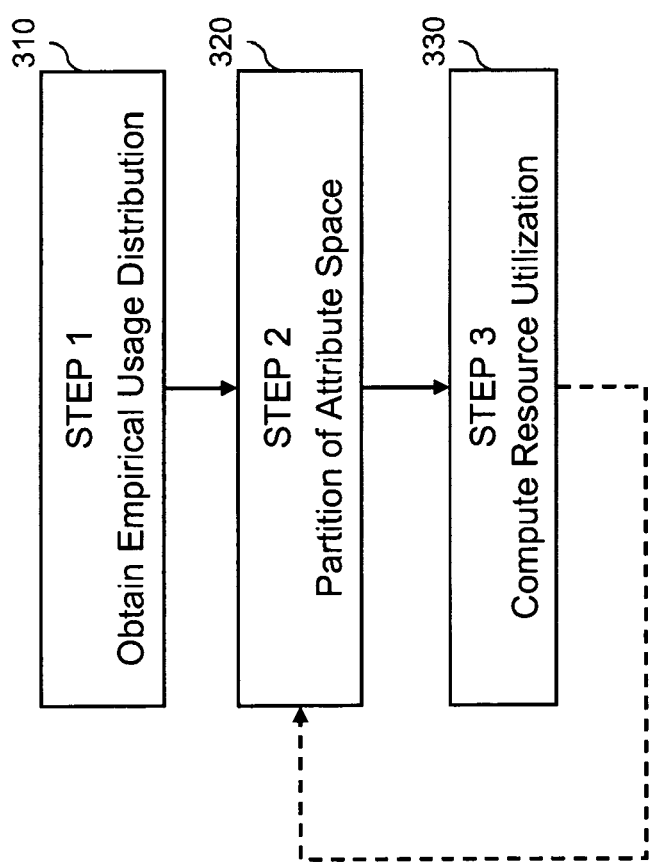
FIG. 3 is a flow diagram illustrating an exemplary approach for attribute-based modeling.

Referring to FIG. 3, very generally, some applications of attributed-based modeling proceed as follows.

STEP 1: Obtain empirical usage distribution that represents a pattern of access of titles in a library. Usage distribution can be a description of access rate (e.g., views per second, average number of concurrent views, Megabits per second) as a function ozone or multiple attributes (e.g., title rank). Such information can be obtained either from actual usage data (e.g., store records from Netflix, Blockbuster, Hollywood Video, etc.), or based on projections (e.g., using video rental data to extrapolate their usage characteristics). In some applications, a continuous mathematical model is formulated to describe usage data.

STEP 2: Partition the attribute space based on usage distribution. Here, a set of schemas are defined, each being associated with ranges of one or multiple attributes (e.g., top 5 percentile of title rank). A schema generally describes how a title with a given set of attributes is assigned resources in the system. Each schema is mapped to a pattern of storage allocation, including for example, a combination of disks on which titles in this schema will be located and the number of copies that will be stored for each title.

STEP 3: Compute resource utilization (e.g., total amount of storage) by integrating resource requirements of each title of the library based on the partitioning result. In some applications, the aggregate resource requirements serve as a basis for determining the number and types of storage servers that will be used in the system.

These three steps can be performed manually or automated in an iterative way to optimize one or multiple objective functions (e.g., cost, resource utilization, inter-title contention, power consumption), and further, by taking into consideration a set of constraints. For example, in situations where utility cost needs to be minimized, after the assignment of initial partitioning parameters, steps 2 and 3 can be iteratively performed to determine a good (or best) way of partitioning that yields the least amount futility cost while satisfying certain constraints that limits some aspects of provisioning (e.g., the total amount of storage and maximum readout rate per disk). If the process at a particular step is not converging effectively, the previous step can be reentered and modified.

To further illustrate attribute-based modeling, two examples are described in greater detail below.

3.1 Example I

Modeling with Single Attribute

Figure 4A:
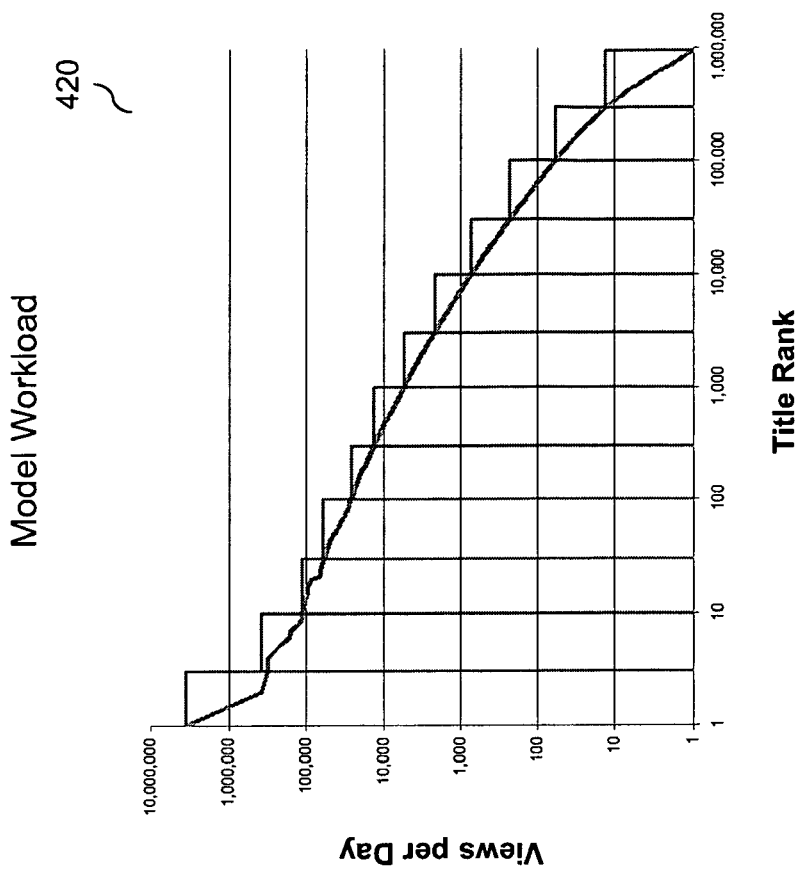
FIGS. 4A and 4B illustrate one example of modeling using a single attribute.
Figure 4A:
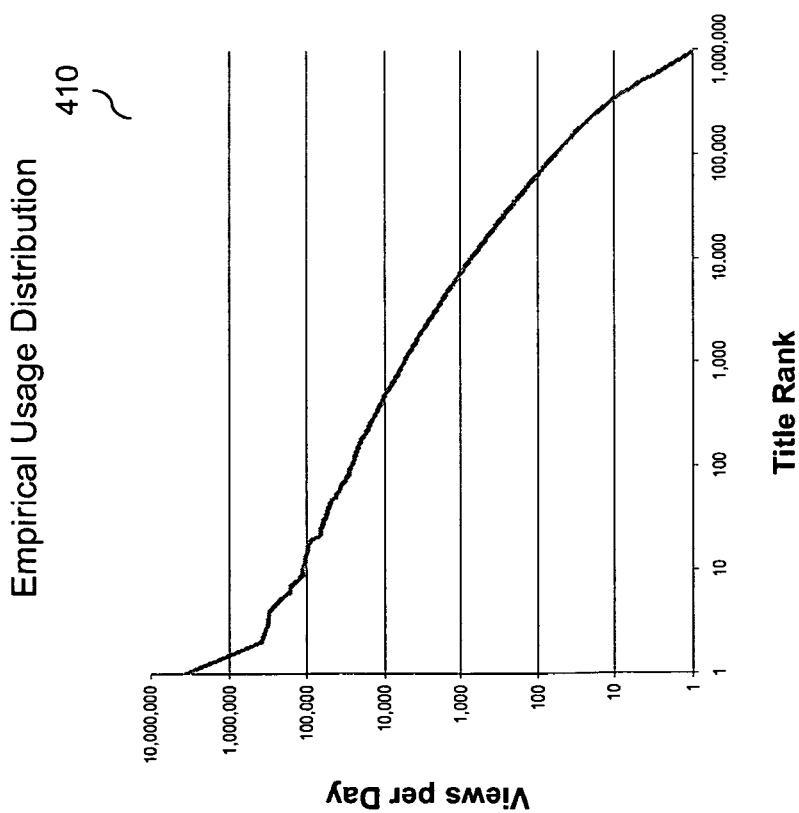
Figure 4B:
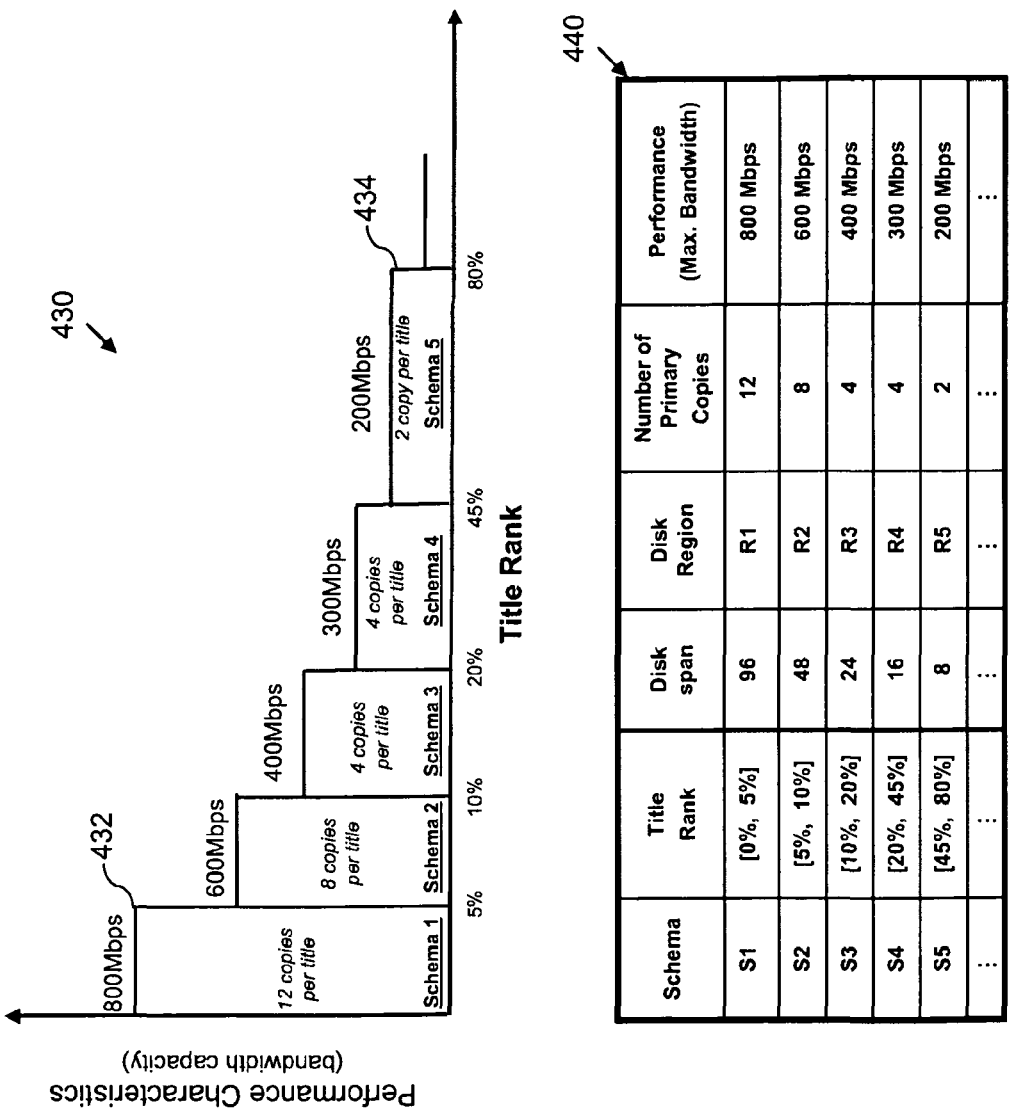

Referring to FIGS. 4A and 4B, in the first example, models for content provisioning are created based on a single attribute—popularity. Here, popularity is an expression of anticipated demand for a piece of content. For example, if content is popular, demand for it will likely be high, and thus the provisioning system will attempt to provision the content with the resources necessary to meet the expected demand.

Graph 410 is a distribution of the access rate (e.g., views per day) of 1 million titles in a user generated video library plotted against popularity rank on a log-log scale. As shown in the graph, access rate (and therefore the demand for access bandwidth) varies widely from title to title. While some of the most popular titles are viewed more than a million counts per day, titles in the lowest rank are accessed no more than once per day. Generating a popularity-based model workload can thus allow system resources to be allocated in ways that are consistent with service objectives (such as title accessibility).

One way of creating a model workload that takes popularity into account is shown in graph 420. A set of quanta are created as a result of sub-dividing the continuous usage distribution curve 410. Each quantum is associated with a range of title rank within which all titles will share a partially determined allocation schema. This model workload provides a framework that later guides the process of content provisioning, e.g., by concentrating more system resources on individuals that have a greater demand. Note that, in producing the model workload, a full variety of quantization schemes (e.g., binary subdivision or ternary subdivision or even non-uniform and non-formulaic subdivisions) can be used. Different quantization schemes may have advantages or disadvantages with respect to different sets of empirical data, specific applications (e.g., providing content in distinct data categories such as movies or online ads), or system configuration that will be used to support the workload.

FIG. 4B illustrates one set of schemas that are applicable in this example. As shown in graph 430, each quantum that spans over a given range along the axis of title rank corresponds to a specific schema. Titles in the same schema share a set of predetermined arrangements and service characteristics, including for example, the number of disks and disk region where each title will be stored, the number of primary copies of each title, and performance characteristics such as the maximum access bandwidth the system is able to offer, as illustrated in provision table 440. For instance, a title that falls within the top 5 percentile will be provisioned according to Schema 1 (S1)—that is, having 12 copies on the storage with each copy stripped on disk region 1 (R1) across a span of 96 disks. Such an arrangement provides a maximum of 800 Mbps access bandwidth.

Based on the schemas, the amount of storage capacity needed for the entire library can be computed and used for determining hardware requirements for the system. For example, if the amount of storage needed for 1M titles is approximately 90TB according to the prescriptive workload, the system can be configured to include 96 1TB disks organized as 4 servers each with 24 disk drives. Further, if it is desired to provide an access bandwidth of 36 Gbps for servicing 40K simultaneous sessions (each session encoded at 900 Kbs) on the system, each disk drive is selected to have at least a sustained readout rate of 400 Mbps.

3.2 Example II

Modeling with Multiple Attributes

Figure 5:
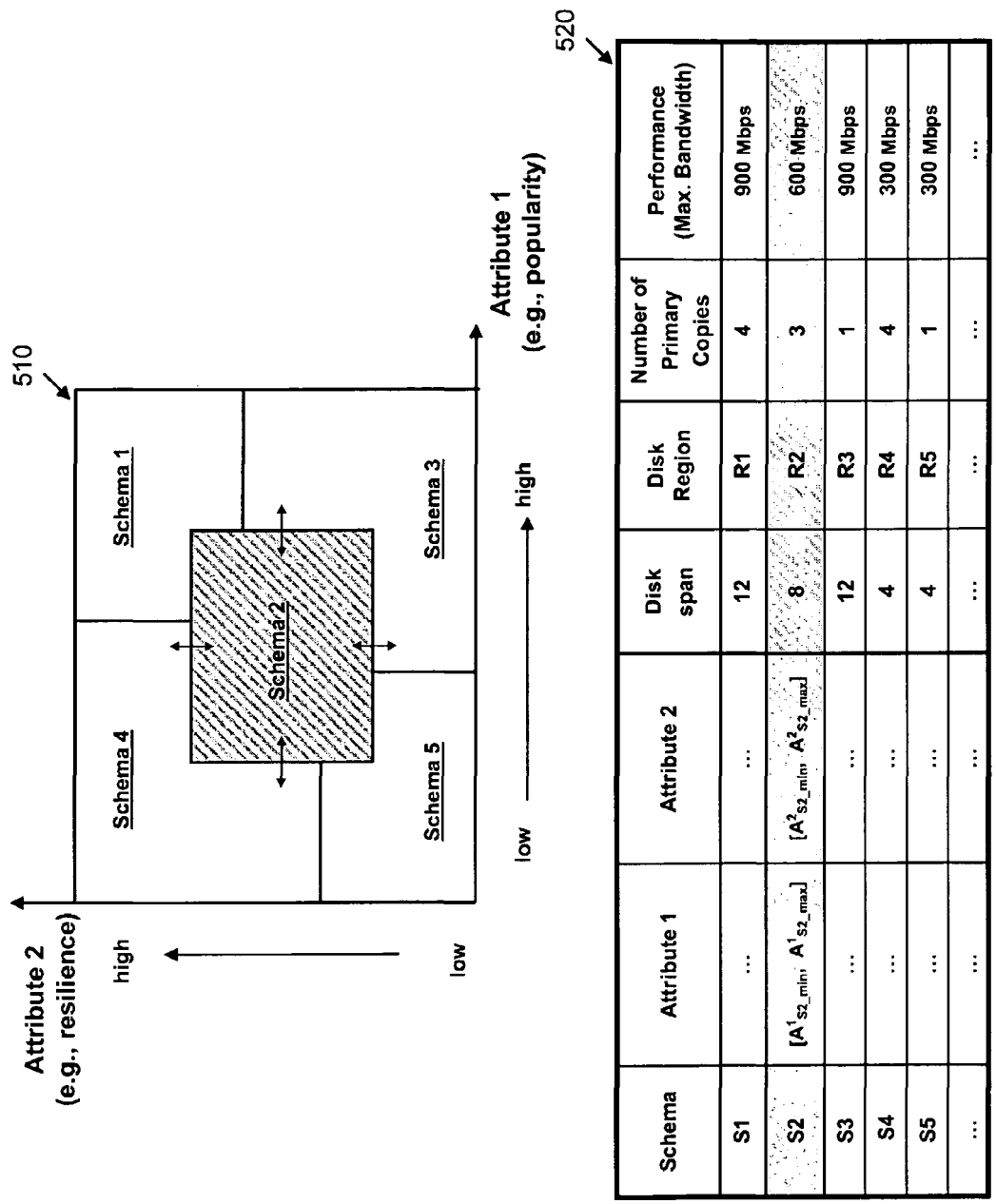
FIG. 5 illustrates another example of modeling using multiple attributes.

Referring to FIG. 5, in the second example, two set of attributes (e.g., popularity and resilience) are both used in creating a model workload. In this description, resilience relates to a predicted level of service maintained to an information object in the presence of component failure. For example, in accessing a resilient object, a customer encountering a failed read on disk A can continue to be serviced through reading an alternative copy of data on disk B. Generally, the more resilient an object needs to be, the more resources (and possibly the more types of resources) the content provisioning system needs to allocate to that object.

Graph 510 illustrates an exemplary subdivision of a two-dimensional attribute space. In contrast with the single-attribute modeling, each schema is now defined by combinations of ranges of each of the two attributes. Again, tittles in each schema are assigned with a set of pre-determined arrangements and service characteristics. For example, titles in Schema 1 correspond to both high resilience and high popularity, and are therefore each stored with 4 primary copies in the fast region (R1) of 12 disks to provide good resilience and accessibility. In comparison, titles in Schema 5 correspond to both low popularity and low resilience, and are therefore each stored with only one primary copy in the slow region (R5) of 4 disks. Each schema can be defined by specified ranges of attribute values. For example, Schema 2 is defined by popularity attribute value in the range of $[A^1_{S2\_min}, A^1_{S2\_max}]$ and resilience attribute value in the range of $[A^2_{S2\_min}, A^2_{S2\_max}]$. This schema provides that each of the three primary copies of the title will be written in R2 across a span of 8 disks. This arrangement gives rise to a 600 Mbps access capacity supportable by the system for each title in S2.

In some applications where more than two attributes are used for generating model workload, subdivision of multi-dimensional attribute space can be performed using a similar approach. For example, each schema will be defined by combinations of value ranges of each one of these attributes. Once a title is allocated to a proper schema based on its attribute values, content provisioning is performed according to the predetermined arrangements assigned to this specific schema.

Another example of attributes that can be used for generating model workload is integrity. In this description, content integrity relates to the ability to recover content after a component failure, even a catastrophic failure of the system. For example, if a disk fails completely and is unrecoverable, the portions of content contained on the disk can be recovered from an alternate copy of the content within the system or across systems and/or from an encoded reconstruction method.

Other examples of attributes include geographical affinity and exclusion, topological affinity and exclusion, and power consumption.

3.3 Other Examples

In some examples, manual or automated optimization can be incorporated in modeling to achieve one or multiple design objectives. One design objective can be, for example, to make best use of available resources, given that the number and types of storage servers have been determined prior to modeling. Another design objective can be to minimize the overall system resource requirements while satisfying the service goals of individual or an aggregate of titles, if hardware components of the system are yet to be determined.

To perform optimization, generally, an objective function is first defined and the inputs that can minimize or maximize its value are determined. (Sometimes, a group of constrains are imposed on the values that the inputs can take.) In the example described in FIG. 5, the definitions of schemas can be viewed as inputs to an objective function of utility cost that needs to be minimized. Beginning with an initial set of inputs (e.g., the current boundary conditions of the schemas in the figure), an optimized set of schema definitions may be found by making small steps of adjustments in the inputs (such as moving the boundaries of Schema 2 along each attribute axis) to arrive at conditions that yield the lowest system cost. (See Re-Modeling below for adjusting model and schemas to optimize a running system.)

In some systems, one advantage of using a model-based approach to manage resource allocation is that the performance and behavior of components and subsystems can be tested prior to building the entire system. The model can be refined to the subsystem or component level, and tests can be devised for the subsystem or component prior to incorporating it into the overall system. For example, multilayer test scripts can be used to test and qualify subsystems on various levels (e.g., an individual disk drive, a group of disk drives, and a complete storage server) and ultimately be extended to the entire system (which includes access servers, storage servers, disk scheduler, and etc). The test results are analyzed and used to determine a desirable system configuration or modification. These results may also provide a verifiable performance objective for the next level of system development.

4 Content Re-Provisioning

Once content has been successfully provisioned to the system and been made available for access, the actual usage of the content may be tracked by collecting content statistics (such as session counts and bandwidth consumption) from storage and access servers. The actual usage of an object may deviate from its level of provisioning, and large deviations can affect overall efficiency of resource utilization. For example, over-provisioned objects may be consuming resources that are not put in active use yet nonetheless are prevented from being allocated for other objects, whereas in the mean time, under-provision objects are assigned insufficient resources resulting in incoming access requests being rejected. Therefore, in order to enable the system to continue to operate in a globally optimal state, a content re-provisioning service is provided.

There are many situations in which content re-provisioning may be desired. A first situation occurs when a title is initially provisioned without attributes (e.g., placed in a default schema and provisioned accordingly), the actual usage of that tile is later used to
determine which schema is appropriate to use and whether the title needs to be re-provisioned. A second situation occurs when a title is initially provisioned using attributes that are not representative of the actual usage (e.g., when marketing promotion boosts a movie's near term popularity), the system detects the discrepancy ("anomaly") between the actual and provisioned levels and orders the title to be re-provisioned by selecting a schema most reflective of the title's actual usage. A third situation of content re-positioning occurs when there is a planned lifecycle management of attributes (e.g., "aging"), and titles are scheduled to be moved between schemas on a pre-determined basis, for example, providing progressively less bandwidth for a title over the lifetime of its release cycle.

In each one of these situations, the content re-provisioning service provides at least two types of operations: 1) up-provisioning, which upgrades provisioning to a higher-level schema that will generally assign more resources to the content; and 2) down-provisioning, which downgrades provisioning to a lower-level schema to release some amounts of resources back to the system. These operations are described in greater detail in the context of anomaly-based and attribute-based content re-provisioning.

4.1 Anomaly-Based and Threshold-Based Re-Provisioning

Generally, anomaly-based and threshold-based content re-provisioning deals (1) with content that has been provisioned using attributes that are not representative of its actual usage or (2) with content whose usage has unpredictably changed such that the provisioning is no longer representative of and appropriate for its actual usage. In addition to being a result of incorrect schema assignment (e.g., due to inaccurate data and/or default schema assignment), "anomaly" can be caused by many other factors, including for example, certain marketing initiatives and unpredictable events (such as the death of an actor) that results in a change in content's near term popularity. When anomaly is detected, or the usage of a piece of content crosses a threshold that indicates that the content is over or under provisioned, then that piece of content will automatically be re-provisioned.

One example of anomaly-based re-provisioning is described in detail below.

Figure 6:
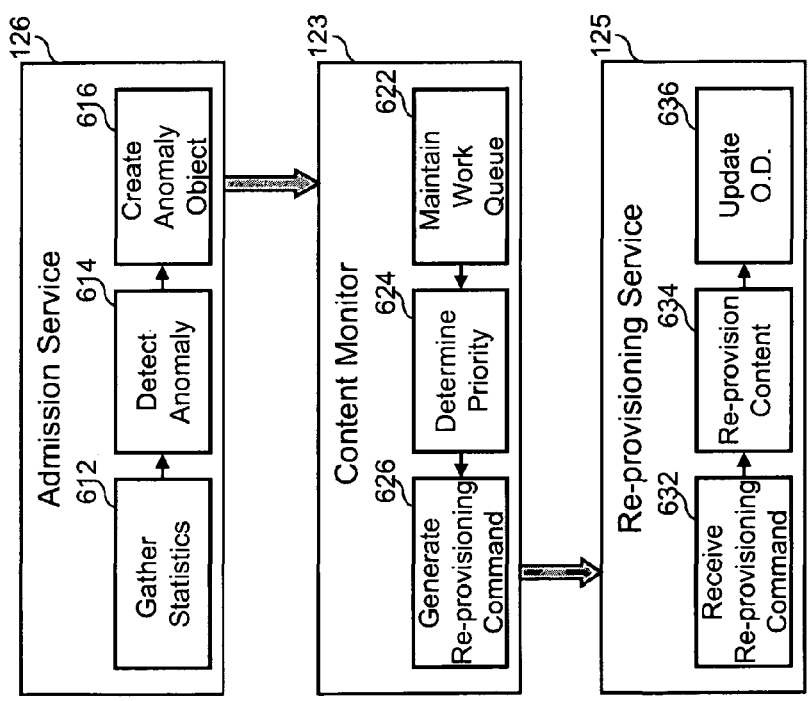
FIG. 6 is a diagram illustrating an exemplary approach of anomaly-based content re-provision.

Referring to FIG. 6, the content re-provisioning service 125 interacts with other services in the system, including the admission service 126 and content monitor 123, to provide the following functionalities.

The admission service 126 gathers and maintains a set of running statistics for each piece of content that is currently being accessed (step 612). Examples of running statistics include the number of admitted concurrent sessions for each object and the total usage across all objects at any given time and over time. The admission service 126 also maintains provisioning anomaly threshold on a per schema basis as part of a service configuration file (step 614). When the actual usage of a title (e.g., an instant access rate) has crossed the anomaly threshold for its corresponding schema (including, for example, exceeds a predetermined threshold for up-provisioning, or falls below a predetermined threshold for down-provisioning), which indicates an unexpected transient usage, a provisioning anomaly object is created (step 616) and provided to the content monitor 123.

The content monitor 123 maintains a work queue (step 622) of provisioning anomaly objects submitted by the admission service 126, and determines and preferably prioritizes a list of outstanding re-provisions (step 624). For example, based on the type of each provisioning anomaly, the content monitor 123 determines whether the anomaly can be remedied by reprovisioning. For content that requires up-provisioning, but is already at the top level of provisioning, a "Provisioning Anomaly Not Repaired" event will be sent and no further processing is required for that content. In some examples, the content monitor 123 places content to be up-provisioned at higher priority in order for the system to be able to admit as many future service requests related to the content as possible. In some other examples when resources for up-provisioning are not immediately available, requests to down-provision content are honored prior to requests to up-provision in order to free up system resources for up-provisioning. For each item on the list of outstanding re-provisions, the content monitor 123 determines a set of new attributes that are representative of its actual usage and subsequently generates a reprovisioning command (step 626) to instruct the re-provisioning service 125 to reprovision the item accordingly.

After content re-provisioning service 125 receives the re-provisioning command (step 632), content is re-provisioned based on the new attributes (step 634). Similar to a general content provisioning procedure described earlier, the re-provisioning service 125 selects a schema corresponding to the new attributes, and assigns resources to write new copies of the content on the storage according to the schema. When content has been given its new provisioning, the re-provisioning service 125 updates content information in the object directory (step 636) and removes old instances of content data from the storage.

In addition to anomaly-based re-provisioning, another type of re-provisioning uses a threshold mechanism to make re-provisioning decisions by taking into account short-term and/or long-term variability (e.g., a viewing trend) of title usage. One example of threshold-based re-provisioning is described below.

Once a title has been stored on the system and made available for access to customers, the usage (or popularity) of this title will naturally change. A new title (e.g., movie, TV episode, news segment) often experiences high usage when first introduced; over time, usage typically decreases, although usage of different titles may decrease at different rates. In some cases, a new title (e.g., a user generated video) will experience very little usage when first introduced, and remain at little or no usage over its entire lifetime; however, social buzz may bring attention to some of these titles resulting in an increase in usage. As the attention wanes, usage decreases.

In this example of threshold-based re-provisioning, a trend of usage of a title is monitored, for example, by computing the first derivative of the title's viewing rates with respect to time). This trend is then measured against a threshold to determine whether the usage of the title follows a projected trend of this title. This projected trend can be configured on a per schema basis (i.e., every title in the same schema is associated with a same/similar projected trend), or alternatively, configured specifically for each title based on its own characteristics (e.g., depending on attributes such as the type and content of titles). If the actual trend of usage of a title substantially deviates from the projected trend (e.g., the title is experiencing a usage increase during the past week as opposed to a projected slow decay), the title will be placed in a re-provisioning list to be re-provisioned. In many cases, re-provisioning actions initiated by threshold-based re-provisioning decisions are conducted by the system at convenient time (e.g., during times of light service load) to reduce disturbance to other operations of the system.

There are several algorithms that can be used in this example of threshold-based re-provisioning. A first implementation is based on a non-weighted backwards looking time window and usage threshold. By discrete sampling of continuous time events, usage distribution of a title is estimated and compared with threshold to determine whether re-provisioning actions need to take place. A second implementation is based on a time-sensitive weighted moving average/sum of usage of a title. More specifically, in recognizing that empirical usage events inherently exhibit a statistical probability that fit a distribution function, a distribution function is used to weight the trailing moving average/sum. This second implementation can reduce sampling errors and aliasing that may occur in a non-weighted implementation, and improve overall system efficiency.

4.2 Schedule-Based Re-Provisioning

In some examples, schedule-based content re-provisioning is performed as a result of lifecycle management, for example, a title that is expected to receive decreasing usage over time can be provided progressively less bandwidth over time in a planned manner. Generally, schedule-based re-provisioning process runs in the background at low priority to keep its impacts on other operations at minimum. One example of schedule-based content re-provisioning proceeds as follows.

Figure 7:
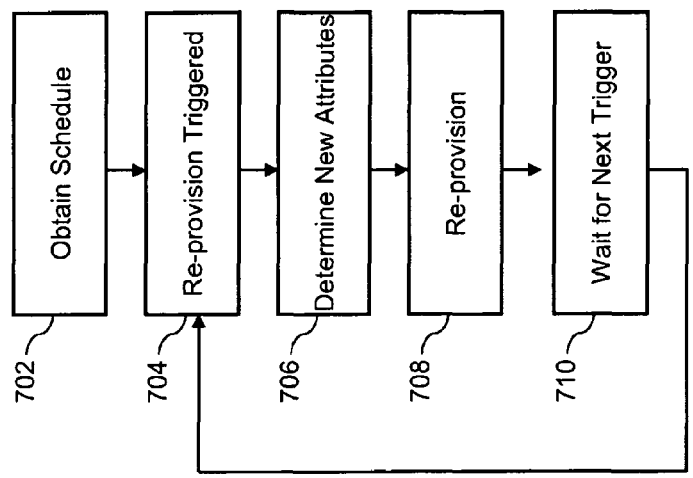
FIG. 7 is a flow chart illustrating an exemplary implementation of schedule-based content re-provisioning.

Referring to FIG. 7, initially, re-provisioning schedules are associated with the titles in the system (step 702). A re-provisioning schedule can be determined manually (e.g., planned by operators based on domain knowledge), or automated (e.g., using a content aging function modeled by gathering content statistics and analyzing a trend of access pattern). The schedule may contain a beginning reference point for the lifecycle and a series of planned re-provisioning actions to be taken (e.g. re-provision a title from its current schema to another specified schema or make a specified change in the title's attributes) and when to take these actions (including, for example, a set of clock time that triggers the actions). Once established, the re-provisioning schedule can be later revised based on the object's actual usage over time and overall system objectives.

When a re-provisioning action is triggered, for example, by a clock time or other triggering events (step 704), a title's new attributes are computed based on the schedule (step 706). The title is then re-provisioned using these new attributes (step 708). After this re-provisioning action completes, the re-provisioning service waits for the next start point to begin another round of re-provisioning actions (step 710).

In some embodiments, the re-provisioning schedules are configured on a contractual base. For example, a schedule includes the start dates/time for a set of re-provisioning actions, and the specifics of the actions to be taken at the time (e.g., a specified provisioning level of the title in each action).

In some other embodiments, the re-provisioning schedules further include a set of usage models configured for re-provisioning purposes, where each usage model corresponds to a particular set of re-provisioning actions. During system operation, the actual usage of a title is measured against the set of usage models to determine the best-matching usage model. The re-provisioning service then re-provisions the title according to the actions corresponding to the best-matching model. At the next trigger when the title is scheduled to be re-provisioned again, if the actual usage of the title is faithful to the usage described in the previously-identified best-matching model, the title will be re-provisioned, again, according to the actions corresponding to this model. If however, the actual usage deviates significantly from what is described in the previously-identified best-matching model, a new best-matching model is selected for the title. Subsequently, the title is re-provisioned according to the set of actions corresponding to this new model.

Generally, the services involved in content re-provisioning, such as content re-provisioning service 125 and content monitor 123 can be provided by one or multiple physical servers. These servers may be one or more access server platforms 120 (as shown in FIG. 1), or one or more external re-provisioning platforms, or a combination of both.

5 Re-Modeling

As described earlier, when actual usage of an individual piece of content appears to be inconsistent with the schema to which the content has been provisioned, the content re-provisioning service is used to re-assign the content to an appropriate schema that can more accurately represent the actual usage. However, in some situations, if such inconsistency occurs on a broader scale, a significant number of re-provisioning requests may occur in the system or the re-provisioning requests can be satisfied, which can cause re-provisioning storms that can unbalance the system and threaten its performance and stability. In addition, when a large portion of the actual workload is performing at levels that deviate from prescribed levels, the prescriptive workload itself may no longer be appropriate for the system achieving desired performances and behavior. Moreover, there are certain system updates (e.g. loss of a failed server or addition of new servers to the system) that will affect the amount of available resources that can be allocated and thus the way content should be provisioned. In those cases, system reconfiguration and/or remodeling on a global scale is recommended. In some embodiments, the system's actual usage is now used as new empirical data (a new 212) to create a new model workload, a new prescriptive workload, new schemas, etc.; these may represent a minor or major change to the system, depending on the extent of differences between previous and new empirical data and system objectives.

Figure 8A:
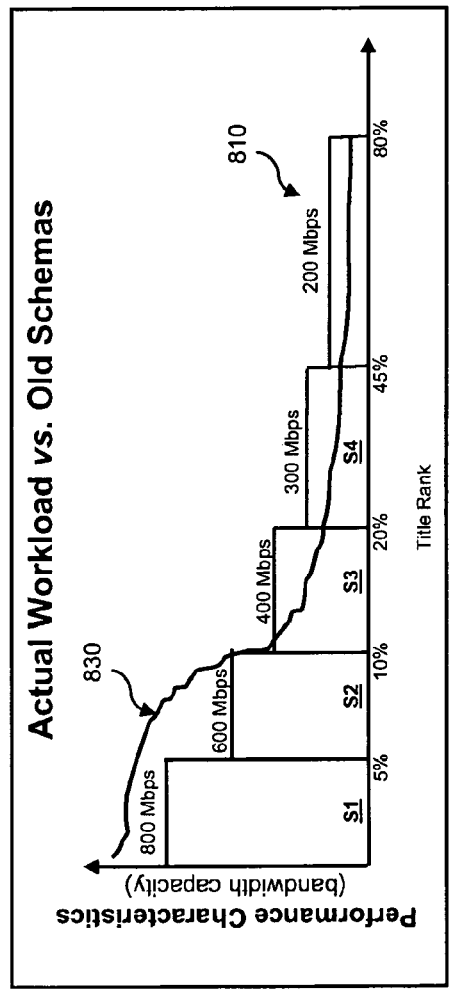
FIGS. 8A and 8B illustrate one example fore-modeling.
Figure 8B:
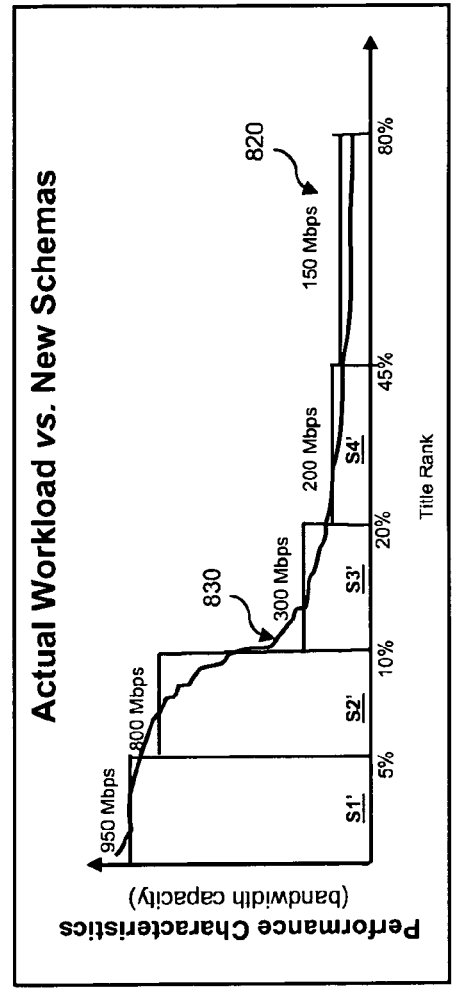

Referring to FIGS. 8A and 8B, in one example, when a large discrepancy is detected between an actual workload 830 of the system and the prescriptive workload 810 that is currently in use for content provisioning, re-modeling is performed to configure a new prescribed workload 820 (including schemas and provision tables) that better match the actual workload 830. As shown in the actual workload 830, titles that are assigned in the first two quanta are under-provisioned because their access rates on average are substantially higher than prescribed levels (i.e., 800 Mbps and 600 Mbps, respectively). By contrast, titles in the remaining quanta are over-provisioned with bandwidth capacities that are not fully consumed during system operation. As a result, the maximum total system performance can be much lower than that was previously designed.

One way to recover such a loss is to rebalance the relative allocation of resources among schemas, as illustrated in the new prescriptive workload 820. Here, the access bandwidth for titles in the first two quanta is raised to 950 Mbps and 800 Mbps, respectively, whereas the rest of the library has been decreased to lower levels accordingly. A new set of schemas (S I" S2', S3', S4', and etc) now replaces the previous set (S1, S2, S3, S4, and etc) to reflect the changes in resource allocation.

Note that in the example described above, a pattern of resource allocation associated with each schema (e.g., disk span and disk region) is affected, but the boundaries of schemas (i.e., the definition of schemas based on divisions of attribute space) remains unchanged. Though, this need not be the case. There are many different ways to create new prescriptive workloads in re-modeling. One alternative way, for example, involves a change in the partitioning of attribute space (e.g., by modifying boundaries of schemas and/or the total number of schemas) and/or the pattern of resource allocation that is mapped to each of the schemas.

Once a new prescriptive workload has been configured, future upload requests will be handled by the content provisioning service according to the new schemas. Previously-provisioned content, on the other hand, can be gradually re-provisioned and migrate into new locations to bring the system back toward optimality. The old and new prescriptive workloads may coexist in the system during this period to facilitate this migration.

Another example of re-modeling occurs with the addition of new resources, e.g., servers, to the system. If the above examples represent a system of 4 storage servers and 4 access servers, expanding the system to, for example, 6 storage servers and 6 access servers can result in a 50% increase in system resources to be allocated. (Here, the number of storage and access servers need not be the same.) Depending on expected new system usage, at least three changes to the prescriptive workload can be made. (1) If the system is being increased because the systems is becoming filled with more lower-popularity titles, then one or more lower-popularity schemas can be added. (2) If overall system usage is increasing and the proportion of usage across titles is as before, then all schemas are proportionally provided more system resources. (3) If the system is being increased because more higher-popularity titles are being added, then one or more higher-popularity schemas can be added. Note that these three scenarios are not exhaustive.

It is to be understood that the foregoing description is intended to illustrate and not to limit the scope of the inven-

What is claimed is:

1. A method comprising:
monitoring, by a computer device and during a first time period, access to stored content, the stored content being accessed, during the first time period, based on a first access schema of a plurality of access schemas, the first access schema including first information associated with a plurality of attributes associated with the access to the stored content;
comparing, by the computer device, actual workload information, associated with the access to the stored content, with prescriptive workload information, the prescriptive workload information being based on the first access schema;
identifying, by the computer device and based on monitoring the access to the stored content and comparing the actual workload information with the prescriptive workload information, a first value of an attribute, of the plurality of attributes, during the first time period;
selecting, by the computer device and based on the first value, a second access schema of the plurality of access schemas, the second access schema including second information associated with the plurality of attributes, the second information including a modified first value, the modified first value being a modification to bandwidth information associated with the stored content to satisfy provisioning of the stored content; and
enabling, by the computer device, the stored content to be accessed based on the second access schema during a second time period that occurs after the first time period.

2. The method of claim 1, further comprising:
monitoring the access to the stored content, based on the second access schema, during the second time period;
determining, based on monitoring the access to the stored content during the second time period, a second value associated with the attribute;
selecting, based on the second value, a third access schema, of the plurality of access schemas,
the third access schema differing from the second access schema; and
enabling, during a third time period that occurs after the second time period, the stored content to be accessed based on the third access schema.

3. The method of claim 1, where, when selecting the second access schema, the method includes:
selecting, as the second access schema, one of the plurality of access schemas that satisfies the modification to the first value of the attribute.

4. The method of claim 1, where, when selecting the second access schema, the method includes:
identifying, based on the first value of attribute, two or more access schemas of the plurality of access schemas;
determining respective costs associated with enabling, during the second time period, access to the stored content based on the two or more access schemas; and
selecting, based on the determined costs, an access schema, of the two or more access schemas, as the second access schema.

5. The method of claim 1, where each of the plurality of access schemas is associated with one or more of:
a storage device associated with the stored content,
a respective quantity of copies of the stored content on the storage device,
one or more storage locations, on the storage device, associated with the stored content, or
an amount of storage space, on the storage device, allocated to the stored content.

6. The method of claim 1, where each of the plurality of access schemas is associated with one or more of:
an access protocol associated with the stored content,
a quantity of channels associated with the access to the stored content,
bandwidth, on the quantity of channels, associated with the access to the stored content, or
a destination to receive the stored content during the access to the stored content.

7. The method of claim 1, where
the access to the stored content is based on a storage resource and an access resource,
the stored content includes a plurality of items, and
each of the plurality of access schemas includes a respective plurality of configuration settings, for the storage resource and the access resource, associated with the plurality of items.

8. A non-transitory computer-readable medium storing instructions, the instructions comprising: one or more instructions which, when executed by a device, cause the device to:
identify, based on comparing actual workload information, associated with access to stored content, with prescriptive workload information, a first value of an attribute, of a plurality of attributes associated with the access to the stored content, associated with the access to the stored content during a first time period, the stored content being accessed, during the first time period, based on a first access schema of a plurality of access schemas, the first access schema including first information associated with the plurality of attributes associated with the access to the stored content, and the prescriptive workload information being based on the first access schema;
determine that the first value differs from a particular value by more than a threshold amount;
identify, based on the first value, a second access schema of the plurality of access schemas, the second access schema differing from the first access schema, and the second access schema including second information associated with the plurality of attributes, the second information including a modified first value, the modified first value being a modification to bandwidth information associated with the stored content to satisfy provisioning of the stored content; and
enable the stored content to be accessed, based on the second access schema, during a second time period after the first time period.

9. The non-transitory computer-readable medium of claim 8, where the one or more instructions to select the second access schema include:
one or more instructions to select, as the second access schema, one of the plurality of access schemas that satisfies the modified first value.

10. The non-transitory computer-readable medium of claim 8, where the one or more instructions to select the second access schema include:
one or more instructions to identify, based on the first value of attribute, two or more access schemas of plurality of access schemas;
one or more instructions to determine respective costs associated with the two or more access schemas; and one or more instructions to select, based on the determined costs, an access schema, of the two or more access schemas, as the second access schema.

11. The non-transitory computer-readable medium of claim 8, where
the access to the stored content is based on a storage resource and an access resource, and
each of the plurality of access schemas include respective settings for the storage resource and the access resource.

12. The non-transitory computer-readable medium of claim 8, where each of the plurality of access schemas is associated with one or more of:
a storage device associated with the stored content,
a respective quantity of copies of the stored content on the storage device,
one or more storage locations, on the storage device, associated with the stored content,
an amount of storage space, on the storage device, allocated to the stored content,
an access protocol associated with the stored content,
a quantity of channels associated with the access to the stored content,
bandwidth, on the quantity of channels, associated with the access to the stored content, or
a destination to receive the stored content during the access to the stored content.

13. The non-transitory computer-readable medium of claim 8, where
the stored content includes a plurality of items, and
a particular access schema, of the plurality of access schemas, includes a respective plurality of configuration settings associated with the plurality of items.

14. The non-transitory computer-readable medium of claim 8, where the instructions further include:
one or more instructions to obtain information related to one or more of:
a quantity of concurrent access requests to the stored content during the first time period,
an aggregate of access requests to the stored content during the first time period, or
a quantity of denied access requests to the stored content during the first time period; and
one or more instructions to determine the first value based on the obtained information.

15. A system comprising: one or more devices to:
monitor, during a first time period, access to stored content based on a first access schema of a plurality of access schemas, the first access schema including first information associated with a plurality of attributes associated with the access to the stored content;
compare actual workload information, associated with the access to the stored content, with prescriptive workload information, the prescriptive workload information being based on the first access schema;
identify, based on monitoring the access to the stored content and comparing the actual workload information with the prescriptive workload information, a first value of an attribute, of the plurality of attributes, during the first time period;
select, based on the first value, a second access schema of the plurality of access schemas, the second access schema including second information associated with the plurality of attributes, the second information including a modified first value, the modified first value being a modification to bandwidth information associated with the stored content to satisfy provisioning of the stored content; and
enable the stored content to be accessed based on the second access schema during a second time period that occurs after the first time period.

16. The system of claim 15, where the one or more devices, when selecting the second access schema, are further to:
select, as the second access schema, one of the plurality of access schemas that satisfies the modified first value.

17. The system of claim 15, where
the first value is outside of a particular range of values, and
the one or more devices, when selecting of the second access schema, are further to:
estimate, based on the first value, respective other values, for the attribute, associated with the access to the stored content during the first time period based on other access schemas of the plurality of access schemas; and
identify, based on the estimated other values, the second access schema, the second access schema being associated with a second value, of the estimated other values, that is within the particular range of values.

18. The system of claim 15, where each of the plurality of access schemas identifies one or more of:
a storage device,
a respective quantity of copies of the stored content on the storage device,
one or more storage locations, on the storage device, associated with the stored content,
an amount of storage space, on the storage device, allocated to the stored content,
an protocol associated with the access to the stored content,
a quantity of channels associated with the access to the stored content,
a bandwidth, on the quantity of channels, associated with the access to the stored content, or
a destination for the stored content.

19. The system of claim 15, where
the stored content includes a plurality of items, and
a particular access schema, of the plurality of access schemas, includes a respective plurality of configuration settings associated with the plurality of items.

20. The system of claim 15, where the one or more devices are further to:
obtain information regarding one or more of:
a quantity of concurrent access requests to the stored content during the first time period,
an aggregate of access requests to the stored content during the first time period, or
a quantity of denied access requests to the stored content during the first time period; and
determine the first value based on the obtained information.

* * * * *